United States Patent [19]

Venable

[11] Patent Number: 4,471,748

[45] Date of Patent: Sep. 18, 1984

[54] COOKING APPARATUS

[76] Inventor: Kurt V. Venable, 1309 W. 2nd St., Crowley, La. 70526

[21] Appl. No.: 463,957

[22] Filed: Feb. 4, 1983

[51] Int. Cl.³ .......................... F24C 1/00; B80H 3/00
[52] U.S. Cl. ................................ 126/1 E; 126/19 M; 99/482
[58] Field of Search ................ 99/482, 467; 126/1 R, 126/1 E, 26, 27, 19 M, 22, 19 R, 55, 25 R, 9 R

[56] References Cited

U.S. PATENT DOCUMENTS

| | | | |
|---|---|---|---|
| 1,433,845 | 10/1922 | Prettyman | 126/9 R |
| 2,722,882 | 11/1955 | Wilson | 99/482 |
| 3,682,154 | 8/1972 | Mollere | 126/9 A |

Primary Examiner—Samuel Scott
Assistant Examiner—G. Anderson
Attorney, Agent, or Firm—Bode & Smith

[57] ABSTRACT

An apparatus which would include a four wall closed structure having a rack on its floor portion in order to accommodate the food to be cooked or smoked. There is further provided a removable top which would have a recessed container means for housing coals or the like as a source of heat, with the recessed pan intruding into the interior of the apparatus. Positioned above the recessed pan means is a grill means hingedly attached to the top portion of the apparatus for placing meat or the like thereupon. The apparatus further comprises a means to smoke the meat while it undergoes baking, and a drain means for draining excess drippings during the cooking process. It also has members for supporting the top portion when the top portion has been removed for tending to the meat within the apparatus without the top portion having to be placed upon the ground or the like.

10 Claims, 5 Drawing Figures

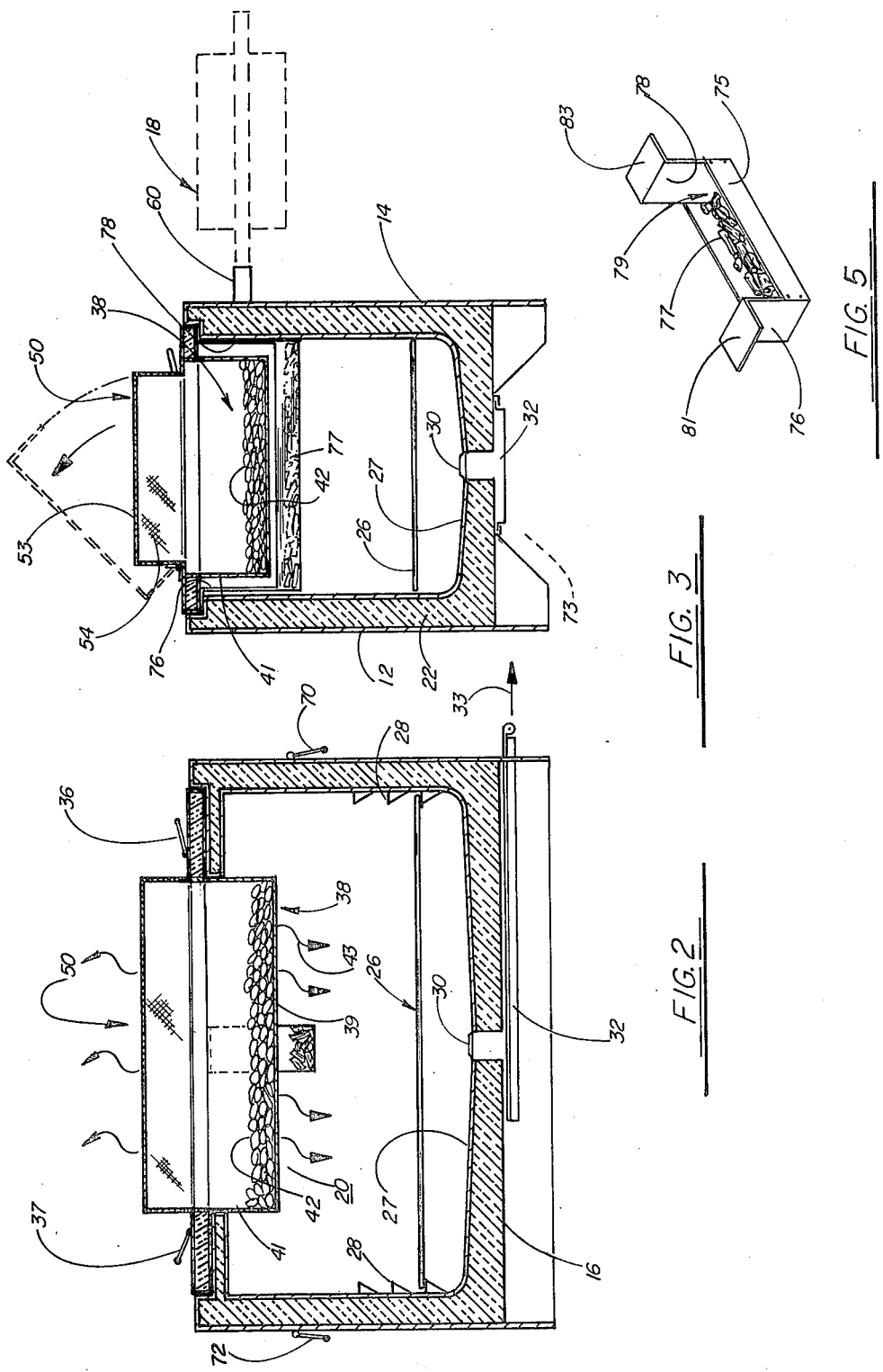

COOKING APPARATUS

BACKGROUND OF THE INVENTION

1. Field of the Invention

The apparatus of the present invention relates to cooking apparatuses. More particularly, the apparatus of the present invention relates to an improved apparatus for simultaneously internally baking and/or smoking and externally cooking food through use of a single source of heat.

2. General Background

In the art of cooking, baking, smoking or other means of preparation of cooked foods, apparatuses have been utilized which would either cook the food through internal means by baking in an oven chamber or smoke chamber or cooking or frying food externally over an open flame or grill. Also, in the preparation of cooked meats, the most popular form of preparation of meats through external cooking is through the use of barbeque outdoors, utlizing charcoal or the like emanating direct heat onto the meat that has been placed on a grill in close proximity thereto.

Another popular means of cooking a large portion of meat, such as the carcass of a steer or pig, is through the use of a spit or the like wherein the carcass is rotated from time to time over an area of flaming coals and the meat is cooked over a long period of time. This particular method of preparing large portions of meat such as that has been less than successful in many cases due to the fact that in order to cook the meat on the inside of the carcass, the heat must be of such a nature that the external meat is overcooked, and often burned. In order to prevent this, the meat must be turned continuously over an extremely long period of time so that the meat cooks evenly on the outside and inside, the long period of time enabling the heat to penetrate the outer layers of meat in order to properly cook the internal layers. This apparatus may also be used as an ice chest becuse it is insulated and water-tight.

Several patents have been obtained by other inventors which address the use of various types of cooking apparatuses in the preparation of cooked foods, the most pertinent as found in the art being as follows:

U.S. Pat. No. 4,130,052 issued to Jacobson entitled "Combination Smoker-Cooker for Food" discloses an apparatus for smoking foods wherein the apparatus is essentially air tight with block or chips to be utilized as a source of smoke and electric heating means for increasing the temperature. This particular apparatus does not teach the use of an external heating source such as coals, for radiating heat downward into the chamber, nor does it teach the ability to grill the meat external to the chamber while the cooking is going on within the chamber, nor the positioning of wood chips abutting against the upper surface of the coals for smoking the meat as it is being "baked" within.

U.S. Pat. No. 4,233,890 issued to Jansen entitled "Outdoor Bar-B-Q Smoker and Grill" shows the use of a combination barbeque and smoker grill simply having multiple cooking racks which are movable from different positions within the cooker so that the food may be grilled on the racks directly above the coals or the like or in a position not above the coals or the like.

U.S. Pat. No. 4,175,485 issued to Wojahn entitled "Quick Smoker" discloses a portable food smoker which is utilized with any type of grill wherein the meat would be cooked. The particular feature of this apparatus is the fact that it will allow smoking of the meat, and any moisture which collects in the apparatus would be allowed to drain off of the top of the apparatus into a moisture retaining channel rather than dropping on the meat during the cooking.

U.S. Pat. No. 3,933,144 issued to Bandy entitled "Barbeque Grill Construction" discloses an apparatus which is primarily unique in the fact that it would allow the starting up of coals without the use of the fluid starter or any other external method. In effect, the apparatus would have its own source of start-up and a novel fuel igniter.

U.S. Pat. No. 3,817,166 issued to McLain entitled "Cooking and Smoking Oven Device" discloses an apparatus which, again provides an electrically heating, cooking and smoking oven for cooking and smoking meats having a removable grease or dip pan which would prevent grease from dripping in the wood material utilized for smoking. Both structurally and functionally, this particular apparatus would be quite unlike the present apparatus.

U.S. Pat. No. 3,081,692 issued to Sorensen entitled "Smoking Kiln" provides an apparatus which is utilized for the preparation of foods by the use of hot smoke. In effect, the apparatus would be curing and smoking meats and the like and, unlike the present apparatus, would have again the source of fuel being internal to the apparatus rather than external as the particular apparatus shows.

U.S. Pat. No. 2,626,559 issued to Rau entitled "Portable Barbeque Oven" would teach the use of an apparatus having an upper grade for supporting the food to be cooked, a lower pan for holding food which is subjected to air movement so that the fuel is properly combusted allowing smoke and heat to move up into the cooking space. There is also included a series of baffles whereby the dripping from the cooking food does not make contact with the fuel.

As seen in the patents as cited in the art, none of the patents disclose the combination as set forth in the preferred embodiment of the apparatus of the present invention, which will be discussed further.

GENERAL DISCUSSION OF THE PRESENT INVENTION

The preferred embodiment of the apparatus of the present invention solves the problems and shortcomings as found in the present state of the art in a simple and straightfoward manner. What is provided is an apparatus which would include a four wall closed structure having a rack on its floor portion in order to accomodate the food to be cooked or smoked. There is further provided a removable top which would have a recessed container means for housing coals or the like as a source of heat, with the recessed pan intruding into the interior of the apparatus. Positioned above the recessed pan means is a grill means hingedly attached to the top portion of the apparatus for placing meat or the like thereupon. The apparatus further comprises a means to smoke the meat while it undergoes baking and a drain means for draining excess drippings during the cooking process. It also has members for supporting the top portion when the top portion has been removed for tending to the meat within the apparatus without the top portion having to be placed upon the ground or the like.

Therefore, it is an object of the present invention to provide an apparatus which cooks food both internally within the apparatus and external to the apparatus simultaneously.

It is a further object of the present invention to provide an apparatus which has the further ability to smoke the food or meat within the confines of the apparatus while the food or meat is being cooked.

It is still a further object of the present invention to provide an apparatus which contains one source of heat for both cooking externally and internally simultaneously.

It is still a further object of the present invention to provide an apparatus which due to its unique contruction and insulated qualities enables internal cooking of food at an increased rate in a thorough and even manner.

In order to accomplish the above objects of the present invention including others, it is a feature of the present invention to provide a closed wall apparatus fully insulated for cooking meat or the like therewithin.

It is still another feature of the present invention to provide an apparatus having a recessed fire box which contains a single source of coals or the like for radiating heat internally into the apparatus and externally for grilling food.

It is still a further feature of the apparatus to provide means for collecting excess drippings from the meat or the like cooked within the confines of the apparatus.

It is still a further feature of the apparatus to provide a container for housing wood chips internal and adjacent to the fire box in order to allow smoking of the food within the apparatus.

It is still a further feature of the apparatus to provide a means for storage of ice for the purpose of cooling foods and beverages.

BRIEF DESCRIPTION OF THE DRAWINGS

FIG. 2 is a side cutaway view of the preferred embodiment of the apparatus of the present invention;

FIG. 3 is an end cutaway view of the preferred embodiment of the apparatus of the present invention;

FIG. 5 is a close-up view of the wood chip container of the preferred embodiment of the apparatus of the present invention.

DETAILED DESCRIPTION OF THE PREFERRED EMBODIMENT

Figures 1, 4:
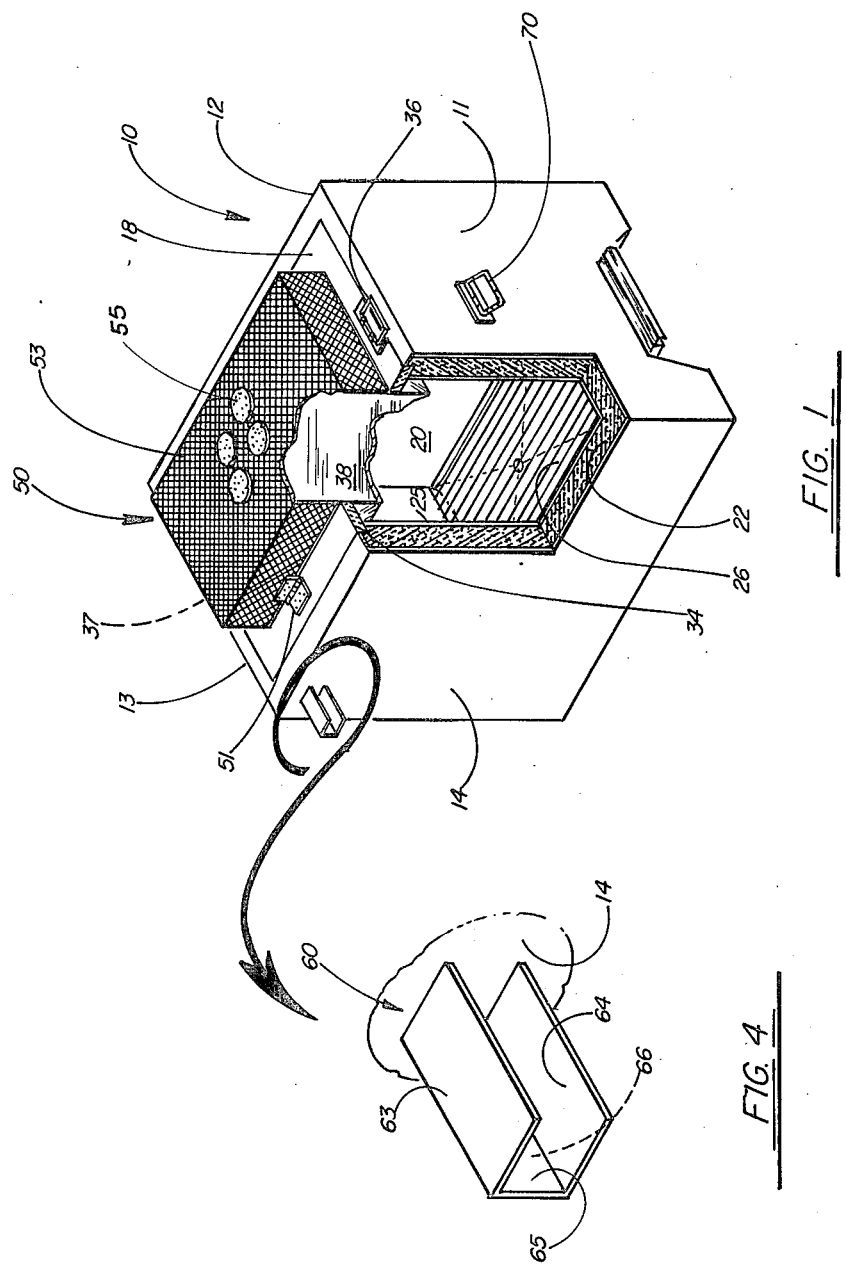
FIG. 1 is a perspective partial cutaway view of the preferred embodiment of the apparatus of the present invention.
FIG. 4 is a close-up view of the removable top support means of the apparatus of the present invention.

The preferred embodiment of the apparatus of the present invention is illustrated in FIGS. 1 through 3 by the numeral 10. Cooking apparatus 10 would be a four wall structure, the four walls designated 11 through 14 respectively having a closed bottom floor portion 16 and a removable top portion 18, together defining an enclosed oven area 20 in which meat or the like is placed during cooking process.

Contained within walls 11 through 14, floor 16 and removable top portion 18 is insulation material 22 which would be a typical insulation material, such as fiberglass or the like, tightly compressed between the exterior metal wall skin 23 and interior metal wall skin 25, which would serve as a housing four the insulation material, of course, the insulation material being utilized to maintain the heat contained within the apparatus during use.

Turning now to the interior of the apparatus as seen best in FIGS. 1 through 3, as was stated earlier, the interior of apparatus 10 included interior metal wall skin 25 which, as is illustrated in FIGS. 2 and 3 completely lined the interior of apparatus 10, would be preferably stainless steel. Also, it should be noted in the figures that sidewalls and floor portion meet not at right angles, but on a slope so that cleaning of the interior is facilitated and made easier. There is provided interior rack 26, which is positioned on floor portion of apparatus 10, serving as a support for the meat or the like which is to be cooked within the apparatus.

Interior rack 26 in horizontal floor portion 27 is supported by a plurality of wall brackets 28, which allow rack 26 to be placed at different levels within chamber 20. In the preferred embodiment, interior rack 26 is removable, and could be cleaned rather easily. As is illustrated in FIG. 1, interior rack 26 would be constructed of a bar metal material whereby drippings or the like may fall through the rack portion 26 onto the floor portion 27 of apparatus 10. As is seen inside views in FIGS. 2 and 3, floor portion 27 of apparatus 10 slopes at an angle toward the center portion 30 of apparatus 10, portion 30 being primarily an oriface or the like for allowing drippings from the meat out of the confines of the apparatus onto drippings tray 32. Drippings tray 32 as is seen in side views in FIG. 2 is a slidably removable tray (see arrows 33) for periodically removing drippings from the meat during the process of cooking. In the preferred embodiment, if one would wish, port 30 could be plugged, so that drippings would remain in the apparatus should one want to obtain grease of gravy during the cooking process.

Apparatus 10 further provides, as was stated earlier, removable top 18 which, as is seen in FIG. 1, is a generally rectangular top portion which for the most part, would rest on cut-out shoulder portion 34, so that when top 18 is placed upon the apparatus, it remains flush with the top portion of the walls of the apparatus. Top portion 18, would be a removable top portion, removable with the use of handles 36 and 37, when one wanted access to the meat being cooked within the confines of the apparatus. Of course, top 18 would fittingly engage the wall portions of apparatus 10 so as to prevent any loss of heat during the internal cooking process.

The primary function of removable top portion 18, other than the sealing of the heat within the apparatus, is to house the fuel which would be utilized in cooking food within the confines or external to the apparatus.

As seen in FIGS. 1 through 3, in the preferred embodiment, top portion 18 would contain recessed fire box 38 which, in the preferred embodiment would be a continuous recessed metal box having floor portion 39 and side wall portions 41 for defining a recessed container for the placing of the fuel, which, for the most part would be charcoals or the like 42, which is illustrated in FIGS. 2 and 3. Due to its solid metal structure, recessed fire box 38 would not allow contact between fuel coals 42 within its confines and the interior 20 of apparatus 10, but would simply provide radiating heat through metal as illustrated by lines 43 downward into the confines 20 of apparatus 10 during cooking. Therefore, the meat or other type of food cooked within the compounds of apparatus 10 would be cooked primarily through baking and not through direct contact with the fuel contained within the recessed fire box 38.

Firebox 38 would be open ended on its upper portion, as is illustrated in FIG. 1, so as to provide access to the open air of the heat radiating upward from fuel coals 42 during use of the apparatus. Of course, it is widely known, that in order for charcoals or the like to properly ignite and continue to burn, they must require continuous source of oxygen. Therefore, the coals would be exposed to the open air as with the use of a barbeque pit or the like.

In the "baking" of meat within the confines 20 of apparatus 10 through the use of coals 42 within recessed firebox 38, should one choose to simultaneously "barbeque", i.e. grill food or meat 55 through access to the open coals, or cook food exterior to the confines of the apparatus, there is provided hingedly attached grill 50 which, is attached to the top portion 18 of apparatus 10 via hinges 51 and 52, (not shown) thus allowing access to firebox 38 for replacement of coals further to or for general cleaning of the box. As is seen in FIGS. 1 through 3, grill 50 comprises grill portion 53 wherein meat or the like is placed for grilling over the open coals 42, and continuous side portion 54, which would allow grill 50 to be raised a predetermined distance from the source of the heat, i.e. coals 42 during grilling of the food externally. This, of course, is necessary so that food being cooked on the grill is not in very close proximity to coals 42 which would result in overcooking or burning of the meat exposed to coals 42. Grill 50 would be approximately the same length and width as fire box 38.

Apparatus 10 further comprises top portion support means 60, as illustrated in FIG. 1, attached to apparatus 10, and in FIG. 4 and blown up view, said pair of support means or spaced apart channel members 60 having a top portion 63 lower portion 64 intergrally attached to side portion 65 at right angles thereto, with holding means 60 being ridgidly attached to wall 14, as is seen in FIG. 1, with screws or the like. Channel portion 63 and 64 define a pair of channel areas 66 which would house the edge portion of removable top portion 18, as seen in phantom view in FIG. 3, so that top portion 18 does not have to make contact with the surrounding floor or ground area around apparatus 10 as it is set aside while having access to the confines 20 of apparatus 10.

As is illustrated in FIG. 1, in the preferred embodiment, apparatus 10 could contain handle members 70 and 72, which would serve as a means for moving apparatus 10 from place to place between or during use of the apparatus. As is further illustrated in FIGS. 1 and 3, the end portions of apparatus 10 would be provided with raised cut-out area 73, in order that tray 32 may be easily removed during use, and so that floor skin 16 of apparatus 10 does not make direct contact with the surface upon which apparatus 10 rests during use, in order to avoid the possibility of scorching or burning of the surface below it.

An additional important feature of apparatus 10 as is illustrated primarily in FIGS. 2 and 5, is wood chip box 75, which would comprise an open tray 79 or the like seen in in FIGS. 2 and 5, which would be supported on the underside of recessed firebox 38, by first and second upward extending handle members 76 and 78 that would engage the top portion of apparatus 10 through lips 81 and 83. In use, chip box 75 would contain wood chips 77, which would normally be oak, hickory or other hardwood. Upon the ignition of the coals 42 contained within recessed firebox 38, the intense heat build up and radiated downwardly into oven chamber 20, would also tend to ignite wood chips 77 contained within wood chip box 75, thus producing smoke which would be confined within the oven chamber 20. Of course, this production of smoke by ignition of the wood chips 77 via the radiated heat out of fire box 38, would provide an additional means to both cook and season the meat or food contained within the apparatus. Should one wish not to smoke the meat or food contained within the apparatus, wood chip box 75 is easily removable, or, wood chips would not have to be placed within the confines of box 75.

In the preferred embodiment, meat or other food contained within apparatus 10, would receive a significant amount of heat during the cooking process, with the heat serving to cook the meat or the like very thoroughly and evenly within the apparatus, under a relatively short period of time. Likewise, the heat radiating upwardly to the atmosphere to be utilized simultaneously grill meat contained on grill 50, during the cooking process.

As stated earlier, the apparatus would be constructed of sheet metal as its outermost walls and second stainless steel as its innermost wall, with insulation material therebetween, thus providing a sturdy, lightweight yet well insulated means for internally cooking meat, and simultaneously grilling meat on the exterior. In the preferred embodiment, the apparatus could be constructed of various sizes to accommodate small portions of food on one hand and to accommodate a carcass of a cow or pig in the larger sizes and could be further utilized as an ice chest when not being used as a cooker due to its insulation from the outside.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A cooking apparatus comprising:
   a. a four-wall closed structure, said four-wall structure defining an oven chamber within, having a floor portion and removable top portion;
   b. said removable top portion comprising:
      i. fuel containing means recessed into said oven chamber for housing fuel for radiating heat downwardly into said oven chamber; and
      ii. perimeter portion laterally extending from said fuel containing means for engaging said four-wall structure; and
   c. grill means contained on said removable top portion having direct access to said fuel source; said fuel source, upon ignition, simultaneously radiating heat downwardly into said internal oven chamber and upwardly to said external grill means.

2. The apparatus in claim 1, further comprising means contained within said oven chamber for housing a secondary fuel source therewithin.

3. The apparatus in claim 1, further comprising means upon which to support the meat being cooked within said oven chamber.

4. The apparatus in claim 1, further comprising a slidable tray means for collecting run off from the meat being cooked within said oven chamber.

5. The apparatus in claim 1, wherein said fuel means allows no direct contact between the fuel contained within said fuel means and said oven chamber.

6. The apparatus in claim 1, further comprising means for supporting said removable top portion without said top portion having to make contact with the surrounding area.

7. A cooking apparatus, which comprises:
   a. a four wall closed structure, said four wall structure defining an oven chamber within, having a removable top portion;
   b. a recessed fuel box attached to said removable top portion for housing fuel therein;
   c. grill means contained on said upper top portion, positioned directly above and having direct access to said fuel source, said fuel source, upon ignition simultaneously radiating heat downwardly into said internal oven chamber and upwardly onto said external grill means; and
   d. smoker means contained within said oven chamber and positioned adjacent the underside of said fuel box, said smoker means providing a source of smoke when said fuel produces adequate heat within said oven chamber.

8. The apparatus in claim 7, further comprising a slidable tray for collecting liquid runoff from the meat being cooked within said oven chamber.

9. The apparatus in claim 7, further comprising means for supporting said removable top portion in order to prevent said top portion from having to make contact with the surrounding area.

10. The apparatus in claim 7, wherein said oven chamber could be utilized as a cold storage compartment upon introduction of ice or the like in said chamber and placement of said top portion thereupon.

* * * * *